Jan. 19, 1971 H. RIEGEL 3,557,229
OXYCHLORINATION OF ETHANE TO VINYL CHLORIDE
Filed Aug. 23, 1967
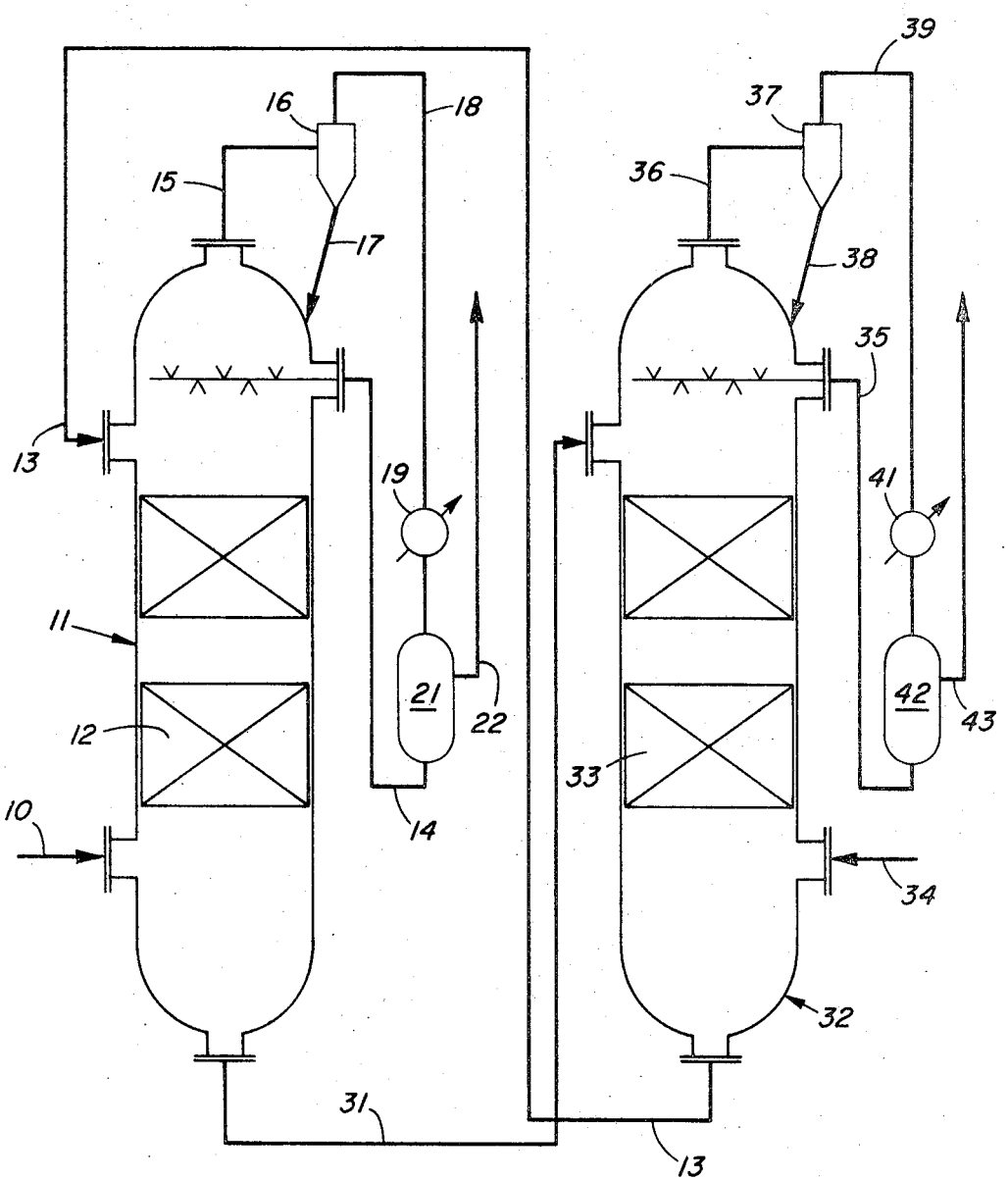
INVENTOR
HERBERT RIEGEL
BY *MARN & JANGARATHIS*
ATTORNEYS United States Patent Office 3,557,229
Patented Jan. 19, 1971

3,557,229
OXYCHLORINATION OF ETHANE TO VINYL CHLORIDE
Herbert Riegel, Maplewood, N.J., assignor to The Lummus Company, New York, N.Y., a corporation of Delaware
Filed Aug. 23, 1967, Ser. No. 662,623
Int. Cl. C07c 21/06, 17/10
U.S. Cl. 260—656
6 Claims

ABSTRACT OF THE DISCLOSURE

A process for producing chlorinated hydrocarbons wherein an aliphatic hydrocarbon is oxychlorinated in the presence of a melt of an oxychlorination catalyst. Thus, for example, vinyl chloride may be produced by reacting ethane with oxygen and hydrogen chloride in the presence of a copper chloride melt.

---

This invention relates to the production of chlorinated hydrocarbons, and more particularly, relates to the production of vinyl chloride, ethyl chloride and dichloroethane.

Chlorinated hydrocarbons, such as vinyl chloride, ethyl chloride, and dichloroethanes, are generally produced from ethylene. Thus, ethyl chloride is commercially produced by reacting hydrogen chloride and ethylene in the presence of an aluminum chloride catalyst, with the reaction being conducted in the liquid phase at a temperature of about 40° C.

Dichloroethanes, in particular 1,2-dichloroethane, are commercially produced by chlorinating ethylene at a temperature of about 50° C. in the presence of an ethylene dibromide catalyst. The production of 1,2-dichloroethane is generally combined with the production of vinyl chloride, with a major portion of the 1,2-dichloroethane being dehydrochlorinated to produce vinyl chloride.

The above processes all use ethylene as a starting material, which increases the selling price of the final product. In addition, the above process for producing vinyl chloride has the additional disadvantages in that a two-step reaction is necessary and that it is difficult to dispose of the hydrogen chloride by-product from the dehydrochlorination reaction.

A chlorinated hydrocarbon may also be produced by the oxychlorination of an aliphatic hydrocarbon, such as dichloroethane from ethylene, however, since this reaction is highly exothermic, it is difficult to control reaction temperatures. In U.S. Pat. No. 3,256,352 to Bohl et al., a process of oxychlorination is described wherein the reaction temperature is controlled by employing a fluidized catalyst bed having two discrete zones. This process, however, is not particularly effective, due to the problems associated with solid-gas heat transfer and catalyst attrition which results in both catalyst loss and fouling. Moreover, the fouling problems are compounded by the necessity for additional cooling utilizing a cooling coil.

Accordingly, an object of this invention is to provide a novel process for producing chlorinated hydrocarbons.

Another object of this invention is to provide a novel process for reducing the overall costs of producing chlorinated hydrocarbons.

A further object of this invention is to provide a novel process for producing vinyl chloride in a single reaction zone.

Still another object of this invention is to provide a novel process for effectively controlling temperature in an oxychlorination reaction.

A still further object of this invention is to provide a novel process for effectively producing vinyl chloride, ethyl chloride and dichloroethanes.

These and other objects of the invention will become more readily apparent from the following detailed description of the invention taken with reference to the accompanying drawing, wherein:

The drawing is a schematic flow diagram of an embodiment of the invention.

The objects of this invention are broadly accomplished by oxychlorinating an aliphatic hydrocarbon in a gas-liquid system; i.e., reacting the hydrocarbon with oxygen and hydrogen chloride in the correct proportions, and more particularly, by oxychlorinating gaseous ethane in the presence of a homogeneous catalyst melt to produce chlorinated hydrocarbons, such as vinyl chloride, ethyl chloride and dichloroethanes.

The catalyst melt is formed from a chloride of a multivalent metal; i.e., a metal having more than one valence state, in particular, those conventionally employed for catalyzing an oxychlorination reaction, such as copper and iron chloride, and preferably, copper chloride. In the case of higher melting multivalent metal chlorides, such as copper chloride, a chloride of a univalent metal, i.e., a metal having one valence state, which is non-volatile and resistant to the action of oxygen under the process conditions is added to the multivalent metal chloride to form a molten salt mixture having a reduced melting point. The univalent chlorides which are preferably employed to form a molten salt mixture having a reduced melting point are the alkali metal chlorides, such as potassium and lithium chloride in particular, but it is to be understood that other metal chlorides and mixtures thereof, such as the heavy metal chlorides, e.g., zinc, silver and thallium chloride, may also be employed. The univalent metal chlorides are generally added in an amount sufficient to adjust the melting point of the molten salt mixture to a temperature of below about 500° F., and in the case of a salt mixture of copper chloride and potassium chloride, the composition of the melt ranges between about 20% and about 40%, preferably 30% all by weight, potassium chloride, with the remainder being copper chloride. It is to be understood, however, that in some cases, the catalyst melt may have a melting point higher than 500° F., provided the catalyst remains in the form of a melt throughout the processing steps.

The oxychlorination of the aliphatic hydrocarbon, preferably a saturated aliphatic hydrocrabon having 1 to 4 carbon atoms, is effected in the gaseous phase, in the presence of the catalyst melt hereinabove more fully described, at a temperature between about 500° F., and about 1100° F., and a pressure between about 0 and about 500 p.s.i.g. The upper temperature limit as a practical matter is determined by the volatility of the catalyst melt, since it is generally not preferable to effect the oxychlorination reaction at temperatures at which appreciable volatization of the catalyst melt occurs.

The oxychlorination reaction is generally effected continuously with residence time that ranges between about 1 and about 60 seconds, with the reactants being introduced into the oxychlorination reaction zone either separately or in admixture with each other. Oxygen may be introduced into the oxychlorination reaction zone in pure form or in the form of an oxygen containing gas, such as air, with the molar ratio of oxygen to aliphatic hydrocarbon generally ranging between about 0.5:1 and about 2:1. The molar ratio of hydrogen chloride to aliphatic hydrocarbon generally ranges between about 1:1 and about 3:1.

The process of this invention is particularly effective for oxychlorinating ethane to produce vinyl chloride, ethyl chloride and dichloroethanes. The oxychlorination reactions for producing these compounds are represented by the following equations:

(1) $C_2H_6 + HCl + O_2 \rightarrow C_2H_3Cl + 2H_2O$
(2) $C_2H_6 + HCl + \frac{1}{2}O_2 \rightarrow C_2H_5Cl + H_2O$
(3) $C_2H_6 + 2HCl + O_2 \rightarrow C_2H_4Cl_2 + 2H_2O$ The oxychlorination of ethane produces a mixture of chlorinated hydrocarbons, and it is contemplated within the scope of the invention to control reaction conditions and ratios to favor production of a desired chlorinated hydrocarbon.

The effluent from the oxychlorination reaction contains chlorinated hydrocarbons and other products in addition to the desired product. Thus, for example, in an oxychlorination process directed to the production of vinyl chloride, the effluent contains, in addition to vinyl chloride, ethyl chloride, dichloroethanes, dichloroethylenes, tetrachloroethylenes, and other polychlorinated materials. Moreover, the reaction effluent contains unreacted starting materials and hydrocarbons, such as ethylene, which are produced during the oxychlorination reaction. The desired final product may be separated from the oxychlorination reaction effluent by any one of a wide variety of conventional procedures, e.g., fractional distillation, and the unreacted starting materials and by-products may be recycled to the oxychlorination reaction zone for ultimate conversion to the final product. As an alternative, the chlorinaed by-products may be separately recovered for other uses.

The invention will be described further with reference to a specific embodiment thereof, illustrated in the drawing. It is to be understood that although the embodiment is described wih reference to oxychlorinating ethane to produce vinyl chloride, the embodiment is applicable, in general, to the oxychlorination of aliphatic hydrocarbons. It is further to be understood that the conditions employed are as hereinabove described.

Referring now to the drawing, a gaseous feed in line 10, containing an oxygen-containing gas, such as air, hydrogen chloride and an aliphatic hydrocarbon, such as ethane, is introduced into a reactor 11, containing suitable packing 12 or other liquid-vapor contacting devices. An oxychlorination catalyst, such as copper chloride, is introduced into the reactor 11 through line 13 in the form of a melt and countercurrently contacts the ascending gaseous feed. As a result of such contact, the ethane, oxygen and hydrogen chloride react exothermically to produce primarily vinyl chloride, ethyl chloride and dichloroethane.

The gas is contacted in the top of the reactor 11 with a quench liquid introduced therein through line 14, resulting in condensation of vaporized melt and vaporization of the quench liquor. The vaporized quench liquid and effluent are withdrawn from reactor 11 through line 15 and introduced into a cyclone separator 16 to effect separation of entrained catalyst. The separated catalyst is withdrawn from separator 16 through line 17 and returned to the reactor 11.

The combined effluent-quench liquid gaseous stream is withdrawn from separator 16 through line 18, passed through condenser 19 to effect condensation of the quench liquid and the vapor-liquid mixture introduced into a separator 21. The quench liquid is withdrawn from the separator 21 through line 14 and recycled to the reactor 11. The gaseous effluent is withdrawn from the separator 21 through line 22 and passed to a separation and recovery zone (not shown).

The copper chloride melt, now at an elevated temperature, due to absorption of the heat of reaction, is withdrawn from reactor 11 through line 31 and introduced into the top of a cooling vessel 32, containing suitable packing 33 or other gas-liquid contact devices. An inert cooling gas is introduced into the bottom of vessel 32 through line 34 and countercurrently contacts the descending melt to effect cooling thereof by direct heat transfer. The cooled melt is withdrawn from the bottom of vessel 32 through line 13 and recycled to the reactor 11.

The cooling gas, now at an elevated temperature, is contacted in the top of the vessel 32 with a quench liquid introduced through line 35, resulting in condensation of vaporized catalyst melt and vaporization of the quench liquid. The vaporized quench liquid and inert gas are withdrawn from vessel 32 through line 36 and introduced into a cyclone separator 37 to effect removal of entrained catalyst. The separated catalyst is withdrawn from separator 37 through line 38 and recycled to the vessel 32. The quench liquid and inert gas are withdrawn from separator 37 through line 39, passed through condenser 41 to effect condensation and cooling of the quench liquid and the gas-liquid mixture introduced into separator 42. The now cooled quench liquid is withdrawn from separator 42 through line 35 and recycled to the cooling vessel 32. The inert gas is withdrawn from separator 42 through line 43 and vented or recycled to the cooling vessel 32 through line 34.

It is to be understood that the above-described embodiment is only illustrative of the invetnion and numerous modifications thereof may be effected within the spirit and the scope of the invention. Thus, for example, the various components of the feed to the reactor 11 may be introduced severally or in various combinations at several different points in the reactor. As another modification, the inert gas from cooling vessel 32 may be passed to a waste heat boiler to recover the heat therefrom by the generation of steam. In this modification, the quench liquid would be eliminated in cooling vessel 32.

The above modifications and numerous other modifications should be apparent to those skilled in the art from the teachings contained herein.

The following example further illustrates this invention, but it is to be understood that the scope of the invention is not to be limited thereby:

EXAMPLE

A gaseous mixture of ethane, hydrogen chloride and air, in the volumetric ratio of 1/1/2.5 respectively, was bubbled at the rate of 225 cm.$^3$/min. (measured at standard conditions) through a molten salt mass maintained at 875° F. The molten salt mass consisted of 21 wt. percent potassium chloride and 79 wt. percent of cuprous chloride and cupric chloride and measured 311 cm.$^3$ in volume. The gas passed continuously to the bottom of the molten salt mass through a glass tube immersed in the salt, and then issued from the tube and bubbled upwardly in direct contact with the salt. The effluent passed through a purification system.

The gas was thus bubbled continuously for a total of 5.5 hours and an effluent sample was taken approximately 5 hours from start. Gas chromatographic analysis of the sample showed that 28% of the ethane feed was converted, of which 37% went to the production of chlorinated hydrocarbons of the composition shown in the tabulation below, the remainder of the converted ethane going to ethylene, carbon dioxide and carbon monoxide.

| | Wt. percent |
|---|---|
| $C_2H_3Cl$ | 18.8 |
| $C_2H_5Cl$ | 68 |
| 1,2-$C_2H_4Cl_2$ | 8.4 |
| 1,2 cis-$C_2H_2Cl_2$ | 0.8 |
| 1,2 trans-$C_2H_2Cl_2$ | 0.8 |
| $C_2HCl_3$ | 3.2 |
| | 100.0 |

The process of the invention has numerous advantages over previous processes for producing chlorinated hydrocarbons, such as vinyl chloride, ethyl chloride and dichloroethanes. The use of ethane as a starting material instead of ethylene, greatly reduces the selling price of the final product. In addition, by producing vinyl chloride in a single step, both capital and operating costs are reduced. Moreover, by effecting the reaction in a gas-liquid system, as hereinabove described, the metal chloride functions both as a catalyst and a heat transfer medium, in a manner superior to gas-solid systems. This minimizes the problems involved in attempting to control overall reaction temperature.

Numerous modifications and variations of the present invention are possible in the light of the above teachings. It is, therefore, to be understood that within the scope of the appended claims the invention may be practiced in a manner other than that particularly described.

What is claimed is:

1. A process for producing vinyl chloride comprising: contacting ethane, hydrogen chloride, and oxygen, in the gaseous phase, with an unsupported melt containing cuprous and cupric chloride at a temperature from about 500° F. to about 1100° F. to produce an effluent containing vinyl chloride; cooling the melt after contacting the gaseous phase; and recycling the cooled melt to the contacting of the gaseous phase.

2. The process as defined in claim 1 wherein the gaseous phase is countercurrently contacted with the unsupported melt.

3. The process as defined in claim 1 wherein the mole ratio of hydrogen chloride to ethane is from about 1:1 to about 3:1 and the mole ratio of oxygen to ethane is from about 0.5:1 to about 2:1.

4. The process as defined in claim 1 wherein the melt includes an alkali metal chloride.

5. The process as defined in claim 3 wherein the melt includes potassium chloride in an amount from about 20% to about 40%, by weight.

6. The process as defined in claim 5 wherein the contacting time is from about 1 to about 60 seconds.

References Cited

UNITED STATES PATENTS 3,332,885  7/1967  Imoto et al. _____ 260—659X

FOREIGN PATENTS 711,287  6/1965  Canada _____ 260—659

LEON ZITVER, Primary Examiner

J. A. BOSKA, Assistant Examiner

U.S. Cl. X.R.

260—659